United States Patent
Jensen et al.

(10) Patent No.: US 10,054,439 B2
(45) Date of Patent: Aug. 21, 2018

(54) REFLECTOR ARRANGEMENT WITH RETROREFLECTOR AND WITH A SENSOR ARRANGEMENT FOR INCLINATION DETERMINATION AND CALIBRATION

(71) Applicant: HEXAGON TECHNOLOGY CENTER GMBH, Heerbrugg (CH)

(72) Inventors: Thomas Jensen, Rorschach (CH); Knut Siercks, Mörschwil (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 641 days.

(21) Appl. No.: 14/641,368

(22) Filed: Mar. 7, 2015

(65) Prior Publication Data

US 2015/0253137 A1  Sep. 10, 2015

(30) Foreign Application Priority Data

Mar. 7, 2014 (EP) .................................... 14158265

(51) Int. Cl.
*G01C 15/00* (2006.01)
*G01C 15/06* (2006.01)
(Continued)

(52) U.S. Cl.
CPC ......... *G01C 15/008* (2013.01); *G01C 15/006* (2013.01); *G01C 15/06* (2013.01);
(Continued)

(58) Field of Classification Search
CPC ........ G01C 9/00; G01C 15/06; G01C 15/008; G01C 15/105; G01C 2009/066
See application file for complete search history.

(56) References Cited

U.S. PATENT DOCUMENTS 5,886,340 A  3/1999 Suzuki et al.
6,072,642 A  6/2000 Shirai
(Continued)

FOREIGN PATENT DOCUMENTS

CN  103487039 A  1/2014
DE  197 10 722 A1  10/1997
(Continued)

OTHER PUBLICATIONS

EP Office Action dated Aug. 4, 2016 as received in Application No. 14158265.0.
(Continued)

*Primary Examiner* — Luke D Ratcliffe
(74) *Attorney, Agent, or Firm* — Maschoff Brennan

(57) ABSTRACT

Reflector arrangement for position determination and/or marking of target points, in particular for industrial or geodetic surveying, having a retroreflector for position determination for the reflector arrangement using parallel, in particular coaxial, beam reflection, and a sensor arrangement. According to the invention, the sensor arrangement has a lens and a sensor which is sensitive with respect to at least one wavelength range, with a reception direction that is orthogonal to the detection surface thereof, wherein the lens and the sensor are rigidly connected such that it is possible using the sensor to determine a location, which is incidence-angle-dependent with respect to the reception direction, of an illumination cross section defined by the lens on the detection surface.

18 Claims, 4 Drawing Sheets

(51) Int. Cl.
*G01C 25/00* (2006.01)
*G01S 7/481* (2006.01)
*G01S 17/02* (2006.01)

(52) U.S. Cl.
CPC ............ *G01C 25/00* (2013.01); *G01S 7/4811* (2013.01); *G01S 17/023* (2013.01)

(56) References Cited

U.S. PATENT DOCUMENTS

| | | |
|---|---|---|
| 6,433,858 B1 | 8/2002 | Suzuki |
| 6,504,602 B1 | 1/2003 | Hinderling |
| 6,667,798 B1 | 12/2003 | Markendorf et al. |
| 7,106,431 B2 | 9/2006 | Odell |
| 7,583,373 B2 | 9/2009 | Schwarz |
| 7,672,049 B2 | 3/2010 | Furhmann et al. |
| 7,804,051 B2 | 9/2010 | Hingerling et al. |
| 8,031,331 B2 | 10/2011 | Meier et al. |
| 8,567,076 B2 * | 10/2013 | Ortleb .................... G01C 15/06 33/228 |
| 8,699,756 B2 | 4/2014 | Jensen |
| 8,830,452 B2 | 9/2014 | Vogel |
| 2005/0105081 A1 * | 5/2005 | Odell .................... G01L 311/26 356/141.5 |
| 2009/0024325 A1 | 1/2009 | Scherzinger |
| 2013/0329218 A1 * | 12/2013 | Vogel .................... B25H 1/0092 356/139.1 |

FOREIGN PATENT DOCUMENTS

| | | |
|---|---|---|
| DE | 199 26 706 A1 | 12/1999 |
| DE | 199 49 580 A1 | 4/2000 |
| DE | 10 2010 024 014 A1 | 12/2011 |
| DE | 10 2012 011 518 B3 | 10/2013 |
| EP | 1 081 459 A1 | 3/2001 |
| EP | 1 200 853 B1 | 3/2003 |
| EP | 1 662 278 A1 | 5/2006 |
| EP | 1 686 350 A1 | 8/2006 |
| EP | 1 734 336 A1 | 12/2006 |
| EP | 2 219 011 A1 | 8/2010 |
| WO | 2007/079600 A1 | 7/2007 |

OTHER PUBLICATIONS

European Search Report dated Aug. 6, 2014 as received in Application No. 14 15 8265.

* cited by examiner

REFLECTOR ARRANGEMENT WITH RETROREFLECTOR AND WITH A SENSOR ARRANGEMENT FOR INCLINATION DETERMINATION AND CALIBRATION

FIELD OF THE INVENTION

The invention relates to a reflector arrangement for determining the position of and/or for marking target points, in particular for construction or geodetic surveying, to a calibration method, and to a computer program product.

BACKGROUND

For surveying a target point, numerous surveying systems have been known since the antiquity. Spatial standard data recorded here are direction or angle and usually also a distance of a measuring system to the target point to be surveyed, and in particular the absolute position of the measuring system is captured in addition to any existing reference points.

Generally known examples for geodetic surveying systems are theodolites, tachymeters and total stations, which are also referred to as electronic tachymeters or computer tachymeters. A geodetic measurement apparatus of the prior art is described, for example, in the publication document EP 1 686 350. Such systems have electrosensory angle and possibly distance measurement functions, which permit the determination of a direction and distance to a selected target. The angle or distance variables are here ascertained within the internal reference system of the system and must still be linked, if appropriate, to an external reference system for absolute position determination.

With respect to the configuration of the surveying systems, numerous different embodiments are known. For example, modern total stations have microprocessors for digital further processing and storing of captured measurement data. The systems generally have a compact and integrated construction, wherein typically coaxial distance measurement elements and computing, control and memory units are present in a system. In dependence on the level of expansion of the total station, it is additionally possible for a motorization of the targeting and sighting device and—in the case where retroreflectors (for example a 360° prism) are used as target objects—means for automatic target finding and tracking to be integrated. As a human/machine interface, the total station can have an electronic display control unit generally a microprocessor computing unit with electronic data storage means—with a display and input means, for example a keyboard. The display control unit is provided with the electrosensory captured measurement data, such that the position of the target point is ascertainable, optically displayable and storable by the display control unit. Total stations known from the prior art can furthermore have a radio data interface for establishing a radio link to external peripheral components, such as for example to a portable data capturing system, which can be configured in particular as a data logger or field computer.

For sighting or targeting the target point to be surveyed, generic geodetic surveying systems have a telescopic sight, such as for example an optical telescope, as the sighting device. The telescopic sight is generally rotatable about a vertical standing axis and about a horizontal tilting axis relative to a base of the measuring system, such that the telescope can be aligned, by pivoting and tilting, with the point to be surveyed. Modern systems can have, in addition to the optical viewing channel, a camera, which is integrated in the telescopic sight and is aligned, for example, coaxially or parallel, for capturing an image, wherein the captured image can be displayed in particular as a live image on the display of the display control unit and/or on a display of the peripheral system—such as for example the datalogger—used for remote control. The optical unit of the sighting device can here have a manual focus—for example an adjusting screw for adjusting the position of a focusing optical unit—or an autofocus, wherein the focus position is changed for example by way of servomotors. Such a sighting device of a geodetic surveying system is described for example in EP 2 219 011. Automatic focusing devices for telescopic sights of geodetic systems are known for example from DE 197 107 22, DE 199 267 06 or DE 199 495 80. The construction of generic telescopic sights of geodetic systems is illustrated in the publication documents EP 1 081 459 or EP 1 662 278.

Commonly used geodetic surveying systems meanwhile by default have an automatic target tracking function for prisms used as target reflectors (ATR: "Automatic Target Recognition"). To this end, for example a further separate ATR light source and a specific ATR detector, which is sensitive to this wavelength (for example a CCD area sensor), are additionally integrated in the telescope.

Also known are measuring systems which are configured specifically for the continuous tracking of a target point and a coordinative position determination of said point. These can, in particular in the technical field of industrial surveying, generally be combined under the term "laser tracker." A target point can be represented here by a retroreflective unit (for example a cube prism), which is targeted using an optical measurement beam of the measurement apparatus, in particular a laser beam. The laser beam is reflected in parallel fashion back to the measuring system, wherein the reflected beam is captured using a capturing unit of the apparatus. Here, an emission or reception direction of the beam is ascertained, for example using sensors for angle measurement, which are associated with a deflection mirror or a targeting unit of the system. Additionally, a distance between the measuring system and the target point is ascertained by capturing the beam, for example using time-of-flight or phase difference measurement.

With respect to the configuration of laser trackers as surveying systems, modern tracker systems have increasingly as standard—a sensor for ascertaining an offset of the received measurement beam from what is known as a servocontrol point. This measurable offset can be used to determine a position difference between the center of a retroreflector and the point of incidence of the laser beam on the reflector, and to correct or adjust the alignment of the laser beam in dependence on said deviation such that the offset on the sensor is reduced, in particular is "zero", and the beam is thus aligned in the direction of the reflector center. By adjusting the laser beam alignment, a continuous target tracking of the target point can take place, and the distance and position of the target point relative to the surveying system can be continuously determined. The adjustment can be implemented in this case using a controlled alignment change of the deflection mirror, which is movable by way of a motor and is provided for deflecting the laser beam, and/or by pivoting the targeting unit which includes the beam-guiding laser optical unit.

For range finding, laser trackers of the prior art have at least one distance meter, wherein the latter can be configured for example as an interferometer. Since such range finding units can measure only relative distance changes, what are known as absolute distance meters, in addition to interferometers, are incorporated in modern laser trackers. By way of example, such a combination of measurement means for range determination is known from the product AT901 from Leica Geosystems AG. The interferometers used in this context for the distance measurement primarily use—on account of the large coherence length and the measurement range thus made possible—gas lasers as light sources, in particular HeNe gas lasers. The coherence length of HeNe lasers can in this case be a few hundred meters, such that with relatively simple interferometer construction it is possible to achieve the ranges required in industrial metrology. A combination of an absolute distance meter and an interferometer for range determination using a HeNe laser is known for example from WO 2007/079600 A1.

In many geodetic applications, points are surveyed by placing specifically embodied target objects (for example surveying poles) at the target point. Said target objects usually comprise a plumb pole with a reflector (for example a 360° prism) for defining the measurement section or the measurement point. In the case of such surveying tasks, data, instructions, language and further information are typically transmitted between the target object—in particular a portable data capturing system at the target object—and a central measuring system for controlling the measurement operation and for fixing or registering measurement parameters. Examples of such data are identification information for the target object (for example the type of the prism used), the inclination of the plumb pole, the height of the reflector above the ground, reflector constants or measurement values such as temperature or air pressure. Said information or situation-related parameters is/are necessary in order to allow highly precise targeting and surveying of the measurement point that is defined by the plumb pole with a prism.

Even in industrial surveying, specifically embodied target objects or auxiliary measuring instruments for surveying a measurement point, in particular a plurality of measurement points, are used. These target objects include contactlessly measuring sensors (for example mobile optical scanning units) and also what are known as probing tools which are positioned by way of their contact point on the measurement point on an object and thus permit surveying of said target point.

By interaction of an above-mentioned measurement system with a reflector unit that is used in each case, it is possible to reliably and precisely determine the position of said reflector (on the auxiliary measuring instrument). For measurements of one or more specific target points, however, the position of the reflector alone is usually not sufficient, since the reflector does not directly indicate the target point to be determined, but said target point is surveyed using the target object or the auxiliary instrument (for example a plumb pole in geodesy).

A determination of the spatial orientation or an inclination with respect to in each case relevant spatial directions of the respective auxiliary instrument is thus additionally necessary in order to derive the position of the target point, which is to be determined using the instrument, together with the determined position of the reflector arranged on the auxiliary instrument. Such an orientation can be determined for example by means of an inclination sensor or an IMU (inertial measurement unit), which is provided in a defined position and location relative to the reflector, or—as is typically used for laser trackers—by means of markings arranged on the auxiliary instrument, with the positions of the markings on the contact probe instrument being precisely known and the orientation being determined by image processing of an image in which said markings are captured with positional reference. The image can be captured by an image capture unit on the part of an above-mentioned surveying system.

A disadvantage of these solutions according to the prior art is not only the limited precision owing to inclination sensors, which are typically embodied as liquid sensors, or owing to the IMU, in particular because of the drift of the sensors provided, in particular over a relatively long period of time, for the inclination or orientation determination. Additionally, the markings provided for orientation determination include an additional error source, that is to say that, by way of example, if one or a plurality of markings are partially covered, a corresponding orientation determination may still be possible, but the orientation can be determined only with limited accuracy.

Even a solution according to EP 1 200 853, in which a prism has a through-passage surface for the measurement beam and the latter is incident in part directly on a sensor, has similar disadvantages with respect to achievable accuracies on account of undefined beam guidance and shaping. Precise determination of the position of the radiation on the sensor is achieved only to a severely limited degree, since this determination accuracy depends considerably on the measurement distance and the beam quality. In addition, the structural configuration is configured to be very complex and spatially demanding (prism in front of the sensor or integration of the sensor in the reflector). On account of structure-related, reflector-internal reflections, it is possible even during a distance measurement to this unit, for significant measurement errors during the distance determination to this unit to occur.

SUMMARY

Some embodiments of the present invention include an improved, structurally less complex apparatus, which allows a more reliable and more accurate position and orientation determination, in particular with up to six degrees of freedom (three translational and three rotational degrees of freedom) for surveying purposes.

Some embodiments are achieved by the implementation of the characterizing features of the independent claims. Features which further develop the invention in an alternative or advantageous manner can be gathered from the dependent claims.

The invention relates, in a first embodiment, to a reflector arrangement for position determination and/or marking of target points, in particular for industrial or geodetic surveying, having a retroreflector for position determination for the reflector arrangement using parallel, in particular coaxial, beam reflection, and a sensor arrangement, wherein the sensor arrangement has a code element with a code pattern. The sensor arrangement additionally has a sensor which is sensitive with respect to at least one wavelength range, with a reception direction that is orthogonal to the detection surface thereof, wherein the code element and the sensor are rigidly connected, with a defined spacing, such that it is possible using the sensor to determine a location, which is angle-dependent with respect to the reception direction, of a projection of the code pattern onto the detection surface.

The spacing between code element and sensor in this context is understood to mean, that is to say in the context of the present invention, a geometric spacing between the two elements—code element and sensor. As a result, this is understood to mean and is defined as the actual structural spacing between these elements, that is to say the shortest connection of the elements. The spacing can be represented, for example, by the linear distance from the boundary surface of the code element to the opposite boundary surface of the sensor or by the distance of the respective centroids of the two elements.

In addition, an optical spacing is defined by this arrangement of the code element in relation to the sensor, wherein the refractive index n of a medium (for example, air or glass) located between the code element (or code pattern) and the sensor is additionally taken into consideration for this purpose. The optical spacing is in this case the geometric distance L (geometric spacing) divided by the refractive index n of the interposed medium (L/n). The optical spacing therefore differs from the geometric spacing as a function of the present refractive index n of the interposed medium or the multiple interposed media (for example, air and glass).

The spacing, which is permanently settable in dependence on respective embodiments for respective measurement requirements, acts here like a lever on the displacement of the projected code, whereby the sensitivity of the sensor arrangement can be adapted.

According to one specific embodiment and with respect to this aspect of the invention, the reception direction of the sensor and an extension direction of the code element are aligned to be mutually orthogonal, and the defined spacing is at least 1 mm and at most 10 mm, in particular wherein an extension direction of the sensor is aligned to be equal to the extension direction of the code element.

According to one special embodiment and with respect to the first aspect of the invention, the sensor arrangement has a body which is at least partially transparent with respect to the wavelength range of the line sensor, in particular a glass body or a plastic body, wherein the body has the code element, in particular wherein the code pattern is provided on or in the body, and/or the body is embodied as the code element.

In the case where the body has the code element, the spacing d of at least 1 mm and at most 10 mm is predefined in particular by the spatial dimensions of the body, wherein the code element (with code pattern) is provided at a first end side of the body and the line sensor is arranged at a second end side of the body in particular opposite the first end side, in particular wherein the second end side and a detection surface of the line sensor form a shared contact surface. The body can be embodied as cuboid, for example, wherein the code pattern and the line sensor are arranged on respectively opposite (parallel) surfaces (=first and second end sides) of the body.

In a further embodiment of the invention, the code element has, according to the invention, regions of different transmissivity at least with respect to optical radiation having a wavelength ($\lambda_B$) from the at least one wavelength range, wherein the code pattern is represented by the regions of different transmissivity, in particular wherein the regions of different transmissivity define a line pattern having different line spacings and/or line widths.

According to a more special embodiment of the invention, the regions of different transmissivity are embodied such that the code pattern defines a linearly extending radiation-transmissive transmission region, in particular a radiation-transmissive region that acts as a gap, having a gap width b. As the result of a projection of the code pattern, at least one corresponding light stripe is obtained.

In particular, the at least one transmission region is provided according to the invention having gap width b and the code element is arranged with a spacing d in relation to the line sensor such that the diffraction condition $d \geq b^2/\lambda_B$, in particular the Fraunhofer diffraction condition $d \gg b^2/\lambda_B$, is satisfied, in particular for the projection of the code pattern when the code element is illuminated using the optical radiation of the wavelength $\lambda_B$.

Furthermore, the at least one transmission region can be configured according to the invention, and the code element can be arranged with a spacing d in relation to the line sensor such that essentially far field diffraction conditions occur for a diffraction of the optical radiation at the sensor arrangement.

The regions of different transmissivity are configured according to a further preferred embodiment according to the invention such that the code pattern along an extension axis of the code element has a plurality of the radiation-transmissive transmission regions having respective (possibly different) gap widths b, wherein the radiation-transmissive transmission regions are arranged substantially parallel to one another and in each case a gap spacing s is defined between each of the two adjacent transmission regions. The gap spacing s can be differently sized between each of the two adjacent transmission regions. The code pattern therefore defines a sequence of light-transmissive regions which act as gaps and can be different with respect to gap widths b and gap spacings s.

According to the invention, in addition, the gap spacing s can in each case be provided and the code element can be arranged with a spacing d in relation to the line sensor such that the condition $d \neq 2 \cdot n \cdot s^2/\lambda_B$ is satisfied, wherein n is an arbitrary number from the set of natural numbers, in particular for the projection of the code pattern when the code element is illuminated using the optical radiation of the wavelength $\lambda_B$.

According to a further embodiment of the invention, the gap width b with respect to the extension axis of the code element is at least 0.05 mm, and also in particular at most 0.2 mm, and the gap spacing s between at least two adjacent transmission regions (likewise with respect to the extension axis of the code element) is at least 0.5 mm, and also in particular at most 5 mm. The regions of different transmissivity are configured accordingly for this purpose.

With respect to the configuration of the code element or of the code pattern, the code is thus formed, according to the invention, in particular of thin, radiation-transmissive gaps with large (in relation therewith) intermediate spacings. This ratio of gap widths b to gap spacings s of the code is chosen on the basis of the preferred Fraunhofer diffraction and the Talbot length limiting the configuration (for nth orders).

These conditions yield in particular a code having, for example, transmittant gaps of 0.05 mm width and an alternating period (=spacing between the gaps) of 0.6 to 0.9 mm. Thus, approximately 12 periods can be imaged on a line array (line sensor) of 8 mm length. The spacing d between code and sensor can be 1 mm to 10 mm in this case, wherein a shorter spacing is preferable if there is a lack of light, but larger spacings increase the resolution. With a spacing d=2 mm, an angle accuracy for the inclination of 30 cc over a measuring range of 40 gon is achieved; in the case of d=5 mm, an accuracy of at least 10 cc is achieved.

At a gap width b of 0.05 mm, a spacing between code and sensor of 5 mm (in the case of perpendicular incident light), a sensor length of 8 mm, and a measuring range for the sensor arrangement of ±45° inclination, the standard deviation is lowest for the angle determination for the gap spacings of 0.6 mm, 0.85 mm, and 1.1 mm distributed over a sensor length of 8 mm.

Specifically, the regions of different transmissivity are configured according to the invention such that an unambiguous location determination of the code pattern imaged onto the line sensor can be carried out on the line sensor from a detected location of the regions on and using the line sensor. For this purpose, for example, a nonperiodic structuring of the code pattern is advantageous (i.e. in particular different gap spacings b).

With respect to a measuring range for the sensor arrangement, the sensor arrangement is preferably configured, according to the invention, such that an inclination of the sensor arrangement with respect to the at least one axis can be derived from the location, which can be determined by way of the line sensor, of the projection of the code pattern on the line sensor within an inclination angle range of up to ±45° with respect to the axis.

Another aspect further relates to a reflector arrangement for position determination and/or marking of target points, in particular for the industrial or geodetic surveying, having a retroreflector for position determination for the reflector arrangement by way of parallel, in particular coaxial, beam reflection and having a sensor arrangement. The sensor arrangement here has a lens and a sensor that is sensitive with respect to at least one wavelength range, with a reception direction that is orthogonal to the detection surface thereof, wherein the lens and the sensor are rigidly connected such that it is possible, using the sensor, to determine a location, which is incidence-angle-dependent with respect to the reception direction, of an illumination cross section, defined by the lens, on the detection surface.

The sensor arrangement is thus configured such that, by way of incidence-angle-dependent beam detection, an inclination with respect to at least one axis for the reflector arrangement can be determined.

According to a specific embodiment of this alternative aspect according to the invention, the sensor is configured here such that, using the sensor, a form of the illumination cross section can be determined—that is to say it can be determined such that, when the sensor arrangement is illuminated with illumination radiation with an illumination divergence which is not rotationally symmetrical, in particular asymmetrical, with respect to the beam direction, an inclination with respect to the at least one axis can be derived from the determinable location of the illumination cross section on the detection surface, and an inclination with respect to a further axis can be derived from the form of the illumination cross section which is formed in the process on the detection surface, in particular of the illumination spot or of the illuminated region.

Within the context of this other aspect, the lens and the sensor are arranged such that the optical axis of the lens is aligned parallel to the reception direction of the sensor, in particular wherein the optical axis intersects the geometric centroid of the detection surface.

Alternatively or additionally, the lens is configured as a cylindrical lens.

The sensor is configured, according to a special embodiment (refers therefore to both a sensor arrangement with a lens and, according to the invention, to such an arrangement with a code element), as a line sensor or an area sensor, in particular as a CCD or CMOS.

With respect to the structural configuration of the reflector arrangement, the latter has, according to a further embodiment of the invention, a carrier structure, using which the target points can be positionally determined and/or marked, wherein the retroreflector and the sensor arrangement are carried by the carrier structure and are arranged in a known positional relation with respect to one another. In particular, the carrier structure is here configured as an auxiliary measuring instrument, in particular as a surveying pole or probing tool, or is configured as a mobile portable field controller with an optical targeting or marking unit for the (coordinative) position determination and/or marking of the target points, or has an add-on apparatus for securing on the auxiliary measuring instrument or the field controller.

The possibility of inclination determination is, according to the invention, not restricted with respect to one axis, but can also be effected with respect to a plurality of axes. For this purpose, the reflector arrangement has, according to a further embodiment according to the invention, at least one further sensor arrangement, in particular carried by the carrier structure, wherein the at least one further sensor arrangement is arranged in a defined alignment and a defined position in relation to the first sensor arrangement for determination of an inclination with respect to a further axis. According to the arrangement of a further sensor arrangement, the reflector arrangement can have a plurality of additional sensor arrangements of this kind in order to provide inclination determination for a plurality of axes and/or a more precise determination with respect to one axis (for example by averaging a plurality of inclination values).

As regards the determination of the inclination for a plurality of axes or the orientation determination for the reflector arrangement, the latter has, in a specific embodiment, according to the invention, a plurality of auxiliary point markings, in particular embodied by light-emitting diodes or reflectors, in a specified and known spatial distribution relative to one another, wherein the auxiliary point markings provide an inclination determination with respect to at least one further axis for the reflector arrangement by image processing of an image in which the auxiliary point markings are at least partially captured, in particular wherein the auxiliary point markings provide a spatial orientation determination.

The reflector arrangement according to a further special embodiment furthermore has an inertial measuring unit for the continuous determination of an orientation and/or inclination of the reflector arrangement, in particular for the determination of a change in the position, orientation and/or inclination, in particular wherein the inertial measuring unit has an accelerometer, a rotation rate sensor, an inclination sensor and/or a magnetic compass. Here, it is possible to adjust inclination data from the IMU at a high measurement rate with the slower measurement rate of the code element as supporting locations in order to compensate for possible temporal drifts of the IMU.

For transmitting data (for example measurement values which must be further processed for the inclination determination or already derived inclination values), the reflector arrangement has, according to a specific embodiment according to the invention, a transmitting unit for data transmission, in particular wherein the transmitting unit is configured such that the data transmission can be carried out by way of emitting electromagnetic radiation, in particular modulated light. This can, for example, also take place by way of the measurement beam for distance measurement (EDM). The synchronization between receiving and transmitting units can also take place by way of a GPS signal to be received from both units. The relevant measurement data are preferably computed in the sensor arrangement so as to keep data transfer small.

The invention additionally relates to a calibration method for a reflector arrangement, which is configured at least for position determination and/or marking of target points, having a sensor arrangement which embodies a reference sensor arrangement, and a first sensor unit, wherein the reference sensor arrangement and the first sensor unit are arranged in known positional relation with respect to one another. Within the context of the calibration method, generation of reference inclination data with respect to a first axis takes place by way of the reference sensor arrangement, and calibration of the first sensor unit takes place with respect to the first axis on the basis of the reference inclination data.

According to the invention, the generation of the reference inclination data takes place by way of receiving illumination radiation, in particular collimated illumination radiation, at an angle of incidence α, determining an illumination radiation incidence region, dependent on said angle of incidence, on a sensor of the reference sensor arrangement, and deriving the reference inclination data from the location of the illumination radiation incidence region and a previously known incidence direction of the illumination radiation.

According to a specific embodiment of the invention, the reference sensor arrangement is embodied by a sensor arrangement of a reflector arrangement according to the invention, that is to say the reference sensor arrangement has a code element with code pattern and a sensor that is sensitive at least with respect to one wavelength range, with a reception direction that is orthogonal to the detection surface thereof, wherein the code element and the sensor are rigidly connected at a defined spacing such that a location, that is angle-dependent with respect to the reception direction, of a projection of the code pattern is determined, using the sensor, as an illumination radiation incidence region on the detection surface of the sensor.

Calibration of the first sensor unit takes place in particular at defined temporal intervals, in particular continuously.

The first sensor unit is embodied according to a specific embodiment of the invention by an inertial measuring unit (IMU) for continuously determining an inclination, orientation and/or position of the reflector arrangement, in particular for determining a change in the inclination, orientation and/or position, in particular wherein the inertial measuring unit (IMU) has an accelerometer, a rotation rate sensor, an inclination sensor and/or a magnetic compass. Alternatively, the first sensor unit is configured as an inclination sensor, in particular a multi-axis inclination sensor, for determining an inclination of the reflector arrangement with respect to a plurality of axes, in particular as a gas inclination sensor.

According to a specific embodiment of the invention, the first sensor unit is used to generate first sensor data which represent the inclination with respect to the first axis, and a degree to which the first sensor data and the reference inclination data match is determined. Additionally, calibration of the first sensor unit is effected in dependence on the degree of the matching, in particular automatically.

According to a further embodiment according to the invention, an inclination determination using the first sensor unit involves a changing measurement error, in particular which increases in the temporal progression, and the measurement error is compensated for by calibrating the first sensor unit, in particular wherein the first sensor unit is configured as an inertial measuring unit (IMU) or as in particular a multi-axis inclination sensor.

Within the context of the invention, the reference inclination data are generated in particular such that the reference inclination data (also) represent an inclination with respect to a second and/or a third axis, the first sensor unit is configured for inclination determination with respect to at least the second and/or third axis, and the calibration of the first sensor unit (also) takes place for the inclination determination with respect to the second and/or third axis on the basis of the reference inclination data.

Furthermore, the reference inclination data are generated according to a specific embodiment of the invention such that the reference inclination data represent a spatial orientation of the reflector arrangement, a position of the reflector arrangement is determined, the first sensor unit is configured for orientation and position determination, in particular for location determination, of the reflector arrangement, and the calibration of the first sensor unit takes place with respect to the functionality thereof for orientation and position determination, in particular location determination, on the basis of the reference inclination data and the determined position.

As a result, a calibration of the sensor unit can be ensured in up to 6 degrees of freedom (6 DOF), such that, for example, an IMU can be recalibrated with respect to these parameters.

According to a further embodiment according to the invention, the reflector arrangement has at least one further reference inclination sensor unit and/or a retroreflector. The at least one further reference inclination sensor unit and/or the retroreflector with a defined alignment and a defined position of the reflector arrangement are here associated with the reflector arrangement for determining an inclination with respect to a further axis or a position.

The invention additionally relates to the use of the reflector arrangement according to the invention (according to the above-mentioned embodiments) for position and inclination determination, by irradiating the retroreflector with measurement radiation and by positionally determining the reflector arrangement by way of the measurement radiation reflected by the retroreflector, and by illuminating, in particular in a collimated manner, the sensor arrangement, wherein an angle of incidence is defined by an alignment of the illumination axis in relation to the capturing direction of the sensor of the sensor arrangement.

Furthermore, such a use of the reflector arrangement relates to a position-sensitive capturing of a beam incidence pattern produced during illumination, in particular of the illumination cross section or the projection of the code pattern, on the sensor, and deriving an inclination of the reflector arrangement with respect to at least the illumination axis from the location, which can be determined by way of the position-sensitive capturing, of the beam incidence pattern on the detection surface, wherein the location of the beam incidence pattern is dependent on the angle of incidence.

In order to suppress surrounding light, the measurement radiation can be modulated with respect to a specific embodiment according to the invention. As a result, it is possible to sum up and subtract dark images (without measurement radiation) and bright images (with measurement radiation), as a result of which an improved signal-to-noise ratio can be achieved.

Furthermore, the invention relates to a computer program product, which is stored on a machine-readable carrier, for controlling or executing an above-mentioned calibration method, in particular if the computer program product is executed on a controlling and processing unit of a surveying system, in particular total station, theodolite or laser tracker.

BRIEF DESCRIPTION OF THE DRAWINGS

The apparatus according to the invention and the method according to the invention will be described in greater detail below solely as examples on the basis of concrete exemplary embodiments which are schematically shown in the drawings, wherein further advantages of the invention will also be discussed. Specifically.

DETAILED DESCRIPTION

Figure 1A:
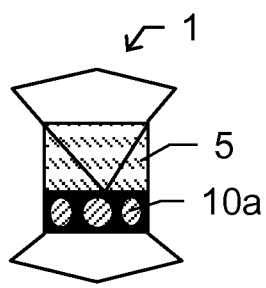
FIGS. 1a-b show in each case an embodiment of a reflector arrangement according to the invention.
Figure 1B:
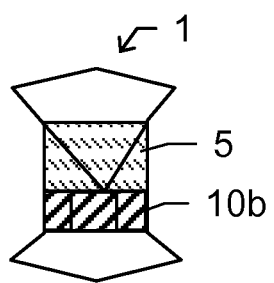

FIGS. 1a-b show in each case an embodiment of a reflector arrangement 1 according to the invention.

The reflector arrangement 1 has in each case one retroreflector 5. Said retroreflector can—as illustrated here—be configured for example as a "360° prism" and can thus be targeted from various directions, with a reflection of the measurement radiation directed at the prism 5 here taking place in a parallel or coaxial manner. Alternatively—although not shown here—the retroreflector could be embodied by a retroreflective film. The reflector is typically targeted with a geodetic or industrial surveying system, for example a total station, a tachymeter or a laser tracker, for the distance and position determination of the reflector 5 in relation to the surveying system. Additionally, absolute coordinates with respect to a current position of the reflector 5 or of the entire reflector arrangement 1 can be determined here.

Additionally, the reflector arrangement 1 has, according to the invention, a plurality of sensor arrangements 10a-b, with which, in addition to the position determination for the reflector arrangement 1, an inclination determination with respect to at least one axis is provided. The inclination determination takes place by illuminating the respective sensor arrangement 10a-b and determining the angle of incidence of the illumination radiation by detecting a location of a beam incidence pattern using a sensor associated with the respective sensor arrangement 10a-b. Such a sensor is configured for determining a position of incidence for radiation that is incident on the detection surface of the sensor, for example as a CCD or CMOS. Depending on the configuration of the respective sensor arrangement 10a-b (and of the illumination radiation), the angle of incidence and thus the inclination can be determined in one, two or three axes.

The illumination radiation used to illuminate and determine the inclination is in particular collimated radiation, in particular laser radiation having a defined wavelength. By way of example, the measurement radiation that can be emitted by a geodetic surveying system (for distance determination) can also be used for illumination purposes, and/or an additional radiation source (and possibly optical unit) can be provided for suitable illumination.

With the knowledge of a propagation direction of the illumination radiation and the determinable angle of incidence, it is then possible to derive an orientation of the sensor arrangement 10a-b and thus of the entire reflector arrangement 1 with respect to at least one axis.

FIGS. 1a-b in each case show a plurality of sensor arrangements 10a-b, which are positioned in each case for example with an angle offset of 60° about a reflector axis. With a corresponding measurement range of approximately 60° of the respective sensor arrangements 10a-b, it is thus possible to determine the inclination from any horizontal direction (within a vertical measurement range given by the sensor arrangements 10a-b, for example likewise 60° of admissible angle of incidence relative to a capturing direction of the respective sensors). In other words, a horizontal measurement range of substantially 360° is covered by this arrangement of sensor arrangements 10a-b. According to other embodiments, the angle offset between the sensor arrangements 10a-b can alternatively be for example 30° or 40°, or be at least smaller than or equal to 90°, such that a reliable inclination determination from substantially any horizontal directions remains possible here, wherein an (albeit negligible) detection gap can occur, possibly between two sensor arrangements 10a-b owing to the selected structural arrangement.

A detailed description for the embodiments of the sensor arrangements 10a-b according to the invention are mentioned in conjunction with FIGS. 1C, 4a-b and 5a-b.

Figure 1C:
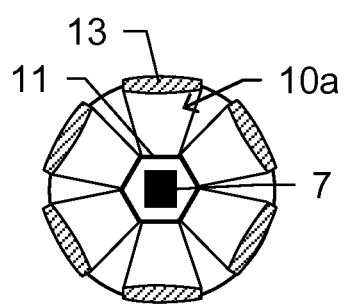
FIG. 1c shows an embodiment according to the invention of a plurality of sensor arrangements provided on a reflector arrangement according to FIG. 1a in cross section.

FIG. 1c shows an exemplary embodiment according to the invention of a plurality of sensor arrangements 10a, provided at a reflector arrangement 1 according to FIG. 1a, in cross section. An individual one of said sensor arrangements 10a here has a lens 13 and a sensor 11 associated with the respective lens 13, wherein they are arranged at a specific and rigid position relative to one another. According to the invention, it is possible for in each case a code element with a specific code pattern (not shown here; see FIGS. 4a-b and 5a-b) to be provided instead of the lens 13. When illuminating such a sensor arrangement 10a, the incident radiation is influenced and/or shaped (for example focused) by way of the code element or the lens 13 such that an illumination pattern or spot, in particular having a shape and size as defined by the code element or the lens 13 and the spacing between code element/lens 13 and sensor 11, is generated on the sensor. The location of this beam incidence region which can be produced in this manner here depends on the angle of incidence of the illumination radiation relative to a capturing direction of the sensor (orthogonal with respect to the photoactive sensor surface or extension direction of the sensor), in particular relative to the optical axis of the lens 13, and can be determined by the sensor 11.

It is possible to derive from the location, which can be determined in this way, of the radiation which is shaped by the code element or the lens 13 (in particular changed on account of refraction with respect to the divergence thereof) and is incident on the sensor 11, an inclination of the respective sensor arrangement 10a or of the entire system of a plurality of sensor arrangements 10a and reflector 5. A detailed description of the lens-sensor arrangement and the inclination determination that can be carried out therewith is specified in FIGS. 3a and 3b.

FIG. 1c furthermore shows an inertial measuring unit 7 (IMU) provided together with the sensor arrangements 10a at a reflector arrangement 1. Said IMU 7 additionally provides an inclination and orientation determination functionality for the reflector arrangement 1, in particular wherein it is possible to determine continuously a change in position and alignment of the IMU 7 and by it. By way of example, the IMU 7 to this end has a magnetic compass for ascertaining North, an inclination sensor for determining the inclination relative to a vector of Earth's gravitational field, and an accelerometer for capturing relative movements of the IMU 7 and thus also of the reflector arrangement 1.

According to the invention, such an IMU 7 can be calibrated on the basis of reference data, which can be generated by way of a sensor arrangement of the reflector arrangement 1. An IMU is typically configured such that it can be used to effect a fast relative position and orientation determination. However, errors in measurements using an IMU add up in the temporal measurement progression, as a result of which the accuracy of the relative orientation determination decreases. By way of a sensor arrangement with code element and sensor, it is, however, possible to determine an inclination or orientation determination very precisely on the basis of an external reference (known propagation direction of the illumination radiation). From such a determination, corresponding reference values with respect to the inclination or orientation of the reflector arrangement can be derived, on the basis of which a (re-) calibration of the IMU can be carried out. To this end, the reflector arrangement has in particular a processing unit and communication means for processing and for adjusting measurement data and for exchanging information with the measuring system emitting the illumination radiation.

A user of such a reflector arrangement can thus, in connection with an IMU (or an alternative inclination meter), for example mainly use the measurement data in the course of a measurement task that are generated by the IMU (or the inclination meter), and recalibrate this IMU (or the inclination meter) at regular intervals (temporal or with respect to the number of measurements carried out) and thus provide a great remaining measurement accuracy over the entire measurement progression. To this end, the reflector arrangement needs to be irradiated only for example by a total station with (collimated) radiation of a known propagation direction, the position of the code pattern projected in the process needs to be determined on and by way of the sensor, and the orientation or inclination of the reflector arrangement needs to be determined from the location of the projection of the pattern and the propagation direction (which is prespecifiable and determinable by way of the total station). This determined inclination is compared to the corresponding output value of the IMU, and the IMU is (re-)calibrated in the case of a specific deviation (for example outside a defined tolerance range) corresponding to the determined orientation or inclination. These steps occur in particular automatically after starting a calibration function provided for this purpose, wherein, however, for example for the last or another step, an additional user-side confirmation input can be requested by the system.

In addition to the above-described calibration capability by the reflector arrangement, the latter can of course also be used for the determination of the inclination of the plumb pole with respect to at least one axis by producing a projection of the code pattern on the sensor with corresponding illumination (in particular for staking specific target points in the terrain or for determining positions of measurement points in industrial surveying (in this case, the plumb pole is typically replaced by a suitable probing tool)).

Figure 2:
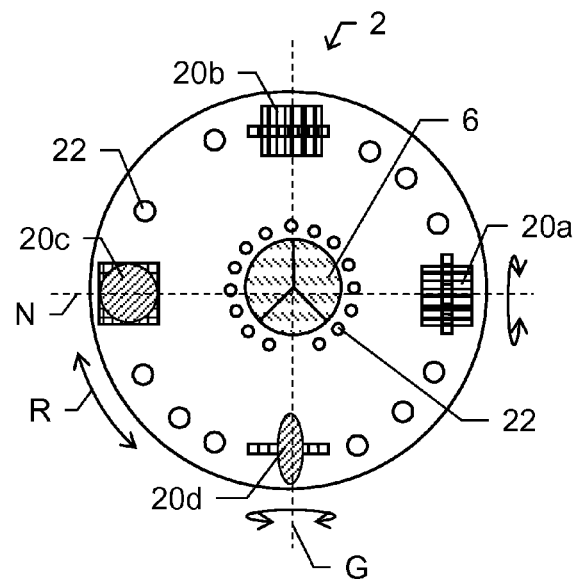
FIG. 2 shows a further embodiment of a reflector arrangement according to the invention with a centrally arranged retroreflector and with four sensor arrangements for determining an inclination for the reflector arrangement with respect to at least two axes.

FIG. 2 shows a further embodiment of a reflector arrangement 2 according to the invention having a centrally arranged retroreflector 6 for position determination for the reflector arrangement 2, having four sensor arrangements 20a-d for determining an inclination for the reflector arrangement 2 with respect to at least two axes (pitch and yaw axis N, G) and with a number of markings 22 arranged in known positional reference for providing an orientation determination with respect to at least a third axis (rolling R about the rolling axis). With this reflector arrangement 2, a 6DOF location determination of the same is possible (location determination with respect to 6 degrees of freedom, with three translational degrees of freedom, which are determined by the targeting unit (theodolite or laser tracker), and three rotational degrees of freedom (determined by the sensor arrangement).

According to the invention, the sensor arrangements 20a-d in each case allow the inclination determination with respect to at least one axis. The two sensor arrangements 20a and 20b are here in each case equipped with a code element and a line sensor, wherein in the case of an illumination of these sensor arrangements 20a-b the respective code of the code element is projected onto the associated line sensor and, by determining the location of the projection of the code onto the line sensor, an inclination of the reflector arrangement 2 can be derived. The sensor arrangement 20a which is aligned along the yaw axis G thus enables an inclination determination with respect to the yaw axis G (about the pitch axis N) and the sensor arrangement 20b enables an inclination determination with respect to the pitch axis N (about the yaw axis G). The detailed construction and the function of these code-sensor arrangements 20a-b are described together with the FIGS. 4a-b and 5a-b.

The two further sensor arrangements 20c and 20d in each case have a lens and a sensor for detecting the radiation which is defined during illumination of the arrangements 20c-d by the respective lens and which is incident on the respective sensor. Owing to the thus determinable location of the illumination cross section on the respective sensor, an inclination of the reflector arrangement 2 with respect to at least one axis can be determined. Due to the existence of an area sensor, the sensor arrangement 20c allows an inclination determination with respect to the yaw axis G (about the pitch axis N) and with respect to the pitch axis N (about the yaw axis G), and the sensor arrangement 20d allows an inclination determination with respect to the pitch axis N (about the yaw axis G).

The sensor arrangement 20c has an area sensor for detecting the incident illumination radiation, as a result of which a relative offset of the incident illumination radiation from a sensor zero point (which is illuminated by way of example in the case of perpendicular incidence of the illumination radiation on the sensor arrangement and corresponds for example to the center of the detection surface of the sensor) in two directions (x direction and y direction of the detection surface of the sensor) and thus also the inclination with respect to two axes (N and G) can be determined with this sensor arrangement 20c. The respective offsets in the x direction and y direction of the detection surface thus represent the respective magnitude of the inclination. Furthermore, the sensor arrangement 20c is configured such that it is possible by way of the sensor not only to determine the location but also the form of the illumination cross section produced on the detection surface. If the sensor arrangement 20c is irradiated with light with an illumination divergence which is not rotationally symmetrical with respect to the beam direction (that is to say with respect to the propagation axis), it is additionally possible by way of the determined form of the resulting light spot (and the location) of the incident radiation, for a rough inclination determination with respect to a third axis, the rolling axis, to occur. Further embodiments with respect to the structure and the function of the sensor arrangements 20c-d with a lens are specified in conjunction with FIGS. 3a-b.

The reflector arrangement 2 according to the invention, as illustrated in FIG. 2, can be equipped according to alternative embodiments (not shown here) optionally with fewer or only one of the sensor arrangements with code element 20a-b illustrated in FIG. 2, or have additional sensors of this kind, for example for increasing the accuracy in the inclination determination.

It is to be understood that the sensor arrangements 20a-d provided at the reflector arrangement 2 provide determination of the inclination with respect to the two axes N and G multiple times. In the context of the invention, only one of the sensor arrangements 20a-b would be sufficient for the determination of the inclination with respect to at least one axis. By way of providing multiples of such sensor elements—as illustrated here—it is possible to achieve a robustness of the measurement values produced for the inclination (for example by averaging the measurement values). Alternatively, consequently analogous or similar embodiments according to the invention with only one or at least one of the sensor arrangements 20a-b are conceivable.

The markings 22 are configured for example as graphic patterns (for example with a great contrast in relation to the background), light-emitting diodes (LEDs) or as reflectors. Said markings 22 can be captured with a camera and in an image which can be generated by the camera. From a geometric location of the individual markings 22 in the image relative to each other, it is possible to deduce a spatial orientation (in up to three axes) of the reflector arrangement 2. To this end, in particular an image processing step, for example edge extraction or brightness and/or contrast analysis, is carried out using the image information provided by the image, as a result of which for example individual image centroids for the respective markings and thus the positions thereof in the image are determined.

The reflector arrangement 1, 2 according to FIGS. 1a-c or can additionally have a securing apparatus, using which the arrangement 1, 2 can be secured for example to a plumb pole or on a construction machine. A user of such a plumb pole having the reflector arrangement 1, 2 according to the invention can consequently carry out, for example in conjunction with a geodetic surveying system such as a total station, an exact position determination of a measurement point to be staked, on account of the fact that a spatial orientation of the plumb pole can always be determined exactly by way of an illumination of the reflector arrangement 1, 2 by the surveying system. This determination is provided by the sensor arrangement (imaging of the code pattern on the sensor) and a corresponding evaluation unit of the total station (or of the reflector arrangement). A position determination can in this case take place using generally known methods for distance measurement to the retroreflector provided. It is thus also possible for the user, for example, to exactly determine measurement points if the plumb pole is not in the vertical or an alternative, but known, orientation.

Figure 3A:
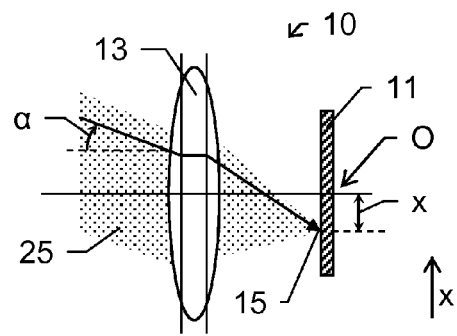
FIGS. 3a-b show in each case an embodiment of a sensor arrangement with a lens and a sensor.

FIG. 3a shows an embodiment of a sensor arrangement 10 of a reflector arrangement with a lens 13 and a sensor 11. The illumination radiation 25 is incident on the lens 13 at an angle of incidence α and is shaped (refracted) by said lens such that, as a result, a defined illumination cross section is produced and illuminated on the sensor 11. The location 15 of this illumination cross section on the detection surface can be determined by the sensor 11. Said determination can take place for example using a centroid determination with respect to the irradiation (intensity distribution on the detection surface).

On the basis of the cross section, illustrated in FIG. 3a, through the sensor arrangement 10, an offset x resulting from the specific angle of incidence α of the radiation incident on the sensor 11 in the x direction is shown. The greater the magnitude of the angle of incidence α is, the greater the offset in the x direction of the incident illumination cross section with respect to a reference position O on the sensor surface also is, wherein said reference position O in this case corresponds to the point of intersection of the optical axis of the lens 13 and the center of the sensor 11 on the detection surface of the sensor 11. The thus determinable offset x thus depends on the respective angle of incidence α, as a result of which it is possible to deduce, by determining the offset x alone, the corresponding angle of incidence α, and as a result an inclination of the sensor arrangement 10 (and thus also of the reflector arrangement, with which the sensor arrangement 10 is associated), with respect to the propagation axis of the illumination radiation 25 can be determined. Using a sensor 11 which is configured as an area sensor 11, it is additionally possible for an offset on the sensor 11 in a second direction (y direction) and thus also the inclination in a second direction with respect to the propagation axis to be determined.

Figure 3B:
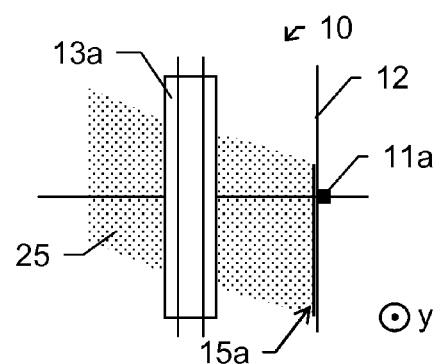

FIG. 3b shows a further embodiment of a sensor arrangement 10. The sensor arrangement 10 has a cylindrical lens 13a and a line sensor 11a. By way of the cylindrical lens 13a, the incident radiation 25 is focused on a plane 12 behind the lens 13a, wherein the focused radiation 25 has, owing to the cylindrical lens 13a, the form of a line 15a in said plane 12. The line sensor 11a is arranged in the plane 12 such that the extension direction of its detection surface is aligned substantially orthogonal to the resulting light line 15a (with respect to FIG. 3b this means that the sensor 11a is aligned along an axis that is orthogonal to the plane of the drawing; y direction).

As a result, an illuminated region is produced on the sensor 11a by way of the focusing of the illumination light 25, and the relative location of which illuminated region on the sensor 11a can in turn be determined. The relative offset of this illuminated region relative to the center of the detection surface of the sensor 11a (this center is intersected by the optical axis or optical plane of the lens 13a) is proportional to the respective angle of incidence with respect to the y direction, that is to say proportional to the inclination of the sensor arrangement with respect to the y direction relative to the propagation axis of the illumination radiation. In conjunction with such explanations, i.e. wherein the illumination radiation shaped by the lens is not completely or virtually completely incident on the sensor, this illuminated region on the sensor 11a should be understood to be an illumination cross section (beam incidence region) on the sensor 11a.

Figure 4A:
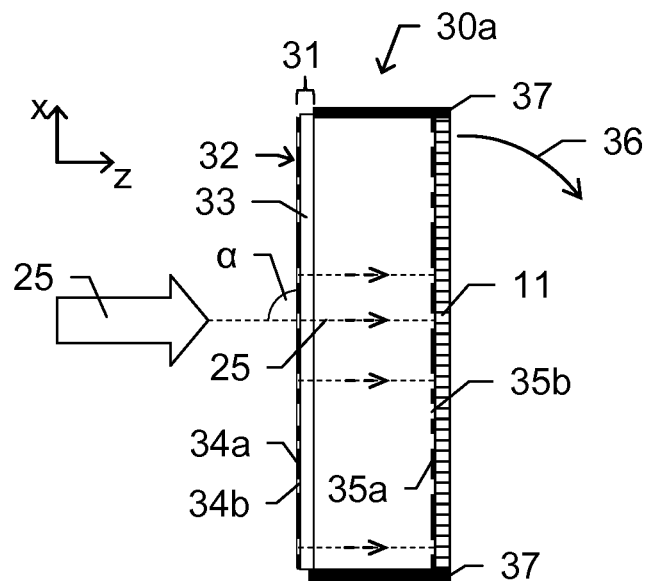
FIGS. 4a-b show in each case a side view of a further embodiment of a sensor arrangement according to the invention with a code element and a sensor.

FIG. 4a shows a side view of a further embodiment of a sensor arrangement 30a according to the invention of a reflector arrangement according to the invention having a sensor 11 for capturing electromagnetic radiation 25 that is incident on the sensor 11, in particular radiation having a defined wavelength range. The sensor arrangement 30a additionally has a code element 31 with a substrate 33 and a code pattern 32 that is applied onto the substrate 33.

The substrate 33 is in this case configured such that the illumination radiation 25, which is used to illuminate the sensor arrangement 30a and is embodied, for example, by the measurement radiation (for example laser radiation) of a surveying system (e.g. total station, theodolite or laser tracker), can radiate through the substrate 33, that is to say the substrate 33 is configured to be transmissive at least with respect to the wavelength of the illumination radiation 25 or with respect to an illumination wavelength range. The substrate 33 can be produced, for example, on a correspondingly transmittant plastic or from a glass that corresponds to these requirements.

The illumination radiation is typically represented by coherent radiation which is substantially collimated.

The code element 31 has different regions 34a, 34b, wherein the respective dark regions 34a are opaque for the illumination radiation 25, and the regions 34b are configured to be transmissive for the illumination radiation. By way of a specific arrangement or—as indicated here—a line-wise sequence of regions 34a and regions 34b (with respect to the x direction), a code pattern is provided by way of the code element 31, which code pattern is projectable (in the form of lines) in the case of illumination onto the sensor 11.

A projection corresponding to the code pattern 32 is thus produced on the sensor 11 in the case of illumination. In other words, a cast shadow is produced on the sensor 11 according to the code pattern 32 provided by the code element 31, wherein the location of the individual shadows 35a caused by the dark regions 33a on the sensor 11 depends on an angle of incidence α of the illumination radiation 25 (cf. FIG. 4b). In the case of illumination of the sensor arrangement 30a with the illumination radiation 25 at an angle of incidence α of 90°, as shown here, the code pattern 32 is imaged entirely (at least with respect to the extent in the x direction) and without offset onto the sensor 11.

The respective illuminated and dark regions 35a, 35b (produced by the projection of the code pattern 32) on the sensor 11 are detectable using the sensor 11, and their relative location on the sensor 11 is determinable. It is possible in turn to derive from the specific location of the individual light stripes 35b and/or shadows 35a and/or the entirety of the light regions 35b and dark regions 35a the current angle of incidence α and to deduce a relative inclination of the sensor arrangement 30a with respect to the incidence direction of the illumination radiation 25. To this end, the sensor arrangement 30a undergoes an initial calibration, wherein the location of the projection of the code pattern 32 on the sensor is determined for at least one illumination state at a defined angle of incidence α.

The code pattern 32, which is embodied as a line code and which has, on account of the transmissive regions 34b, lines (gaps) of varying widths and with varying line spacings (definable by the sizes of the opaque regions 34a) between adjacent lines, and the lines of which are arranged substantially parallel to the detection surface of the sensor 11, thus produces, in the case of illumination, lines on the sensor 11, the locations of which on the sensor 11 can be determined by the sensor 11a, which detects in a position-sensitive manner at least with respect to the x axis. If the inclination of the sensor arrangement 30a changes in the inclination direction 36 or in the x-z plane, the location of the individual lines projected onto the sensor 11 or the entirety of the lines changes, from which the inclination value for the inclination direction 36 can be derived (cf. FIG. 4b). This determination can be based for example on the calibration carried out and be effected by processing known position and alignment values which indicate a relative position and alignment of the code element 31 in relation to the sensor 11.

For reliably determining the angle of incidence α from the location of the projection of the code pattern 32 on the sensor 11, a spacer component 37 is provided, which holds the code carrier 33 in a secure and fixed position relative to the sensor 11. This ensures that the code pattern is always present such that it is rigid in a specific and defined position and alignment and at a defined spacing relative to the sensor 11, and the code pattern 32 is projected onto the sensor 11, in dependence on the inclination of the arrangement 30a, with a defined offset. The location of the projection of the pattern on the sensor 11 is thus determined by the inclination of the sensor arrangement 30a in the x-z plane or with respect to the inclination direction 36 and by the spacer component 37.

The spacing between the sensor 11 and the code element 31 is, according to the invention, between 1 mm and 10 mm, and is given by the spacer component 37.

Figure 4B:
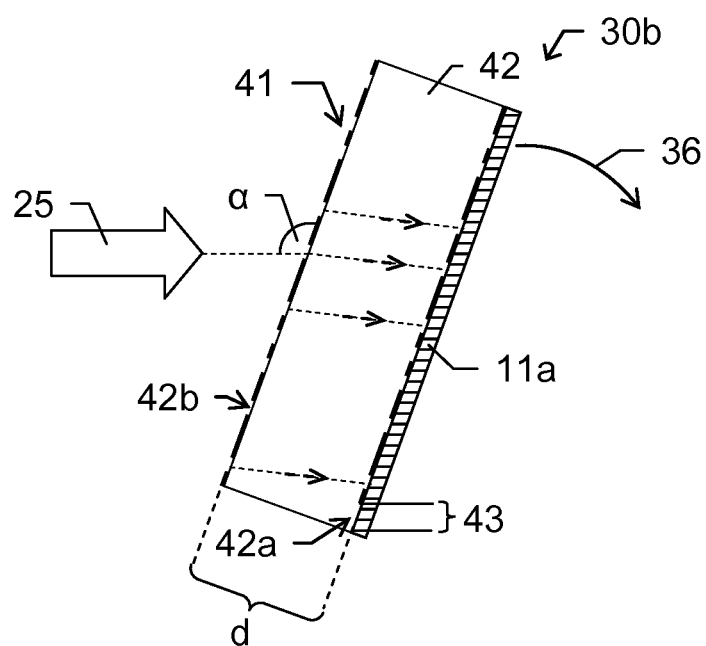

FIG. 4b shows a side view of a further embodiment of a sensor arrangement 30b of a reflector arrangement according to the invention. The sensor arrangement 30b has a line sensor 11a (for example configured as a CCD sensor) and a code element 41, which provides a code pattern with light-transmissive gaps of varying widths (gap widths) and with various gap spacings.

The code element 41 is arranged on a body 42 that is transmissive for the illumination radiation 25. Arranged at a first end face 42a of the body 42 is the sensor 11a, and provided at a second end face 42b of the body 42 is the code element 41. The body 42 is here furthermore configured such that a fixed and rigid positioning of the code element 41 relative to the sensor 11a is ensured, wherein with this arrangement a great robustness for example with respect to external influences (for example impacts or thermal deformation) is provided. The code element 41 or the code pattern is, in the embodiment illustrated, arranged directly on the body 42 (code element 41 and body 42 are configured in one piece), that is to say the gaps or lines that provide the code pattern are applied onto the body 42 (for example printed or engraved).

According to one alternative embodiment—not illustrated here—the code element 41 can be applied onto the body as a foil on which the code pattern is printed, in particular bonded by way of an adhesive.

As a result of the specific configuration of the body 42, the code element 41 is rigidly connected to the sensor 11a at a specific spacing d (from 1 mm to 10 mm). This spacing d can be set by a body 42 which is adapted in each case to the desired requirements. In dependence on this spacing d, it is possible to superpose a near-field diffraction pattern (Fresnel diffraction) on a cast shadow image projected onto the sensor 11a.

For reliable and accurate evaluation of the projection of the code pattern on the sensor 11a, the spacing d between the sensor 11a and the code pattern specifically is chosen such that, for the diffraction at the code element 41, or at the individual gaps produced by the lines of the code pattern, far-field conditions apply. Instead of a purely Fresnel diffraction, Fraunhofer diffraction then occurs, i.e., a resulting intensity distribution of the diffracted radiation on the sensor as in at infinite range.

In the case of an alternative preferred choice of the spacing d, a diffraction pattern which is also suitable can be provided as a diffraction transition between Fresnel and Fraunhofer diffraction, wherein this is referred to as a provision of the line sensor 11a in a transition range in relation to the code pattern 41.

Furthermore, in the case of the design of the sensor arrangement 30b, in particular with respect to the generation of a desired diffraction pattern, in addition to a suitable spacing d, in particular a matching design of the code pattern is considered, i.e. in the case of a line code, the arrangement and dimensioning of the light-transmissive gaps are set accordingly (for example, gap spacing in relation to gap width).

The illumination radiation 25 is incident in the case shown according to FIG. 4b at an angle of incidence α>90° on the sensor arrangement 30b, whereby the lines of the code pattern are projected with a certain offset 43 (with respect to incidence of the illumination radiation at an angle of incidence α=90°) onto the sensor 11a.

The line sensor 11a is implemented at least with respect to the x direction for the position-sensitive detection of electromagnetic radiation. The accuracy of the detection of the radiation incident on the sensor 11a is dependent in this case at least on the resolution capability of the sensor and the resulting diffraction pattern, wherein a precise localization of intensity patterns having steep flanks (as exist in the case of Fresnel diffraction) is more difficult and more inaccurate to implement than a localization of intensity patterns having flatter flanks (as provided in the case of Fraunhofer diffraction or the described diffraction transition). The accuracy of the position determination of the radiation incident on the sensor 11a thus increases upon leaving the diffraction close range and reaching the transition range.

The offset 43 of the projected code pattern on the sensor 11a can therefore be determined from the illumination radiation 25 which can be detected and a corresponding sensor signal can be generated. From the determined offset or by means of the generated sensor signal, an inclination (with respect to the inclination direction 36) of the sensor arrangement 30b in relation to the beam direction of incidence of the illumination radiation 25 can then in turn be derived, i.e. the angle of incidence α can be determined.

Figures 5A, 5B:
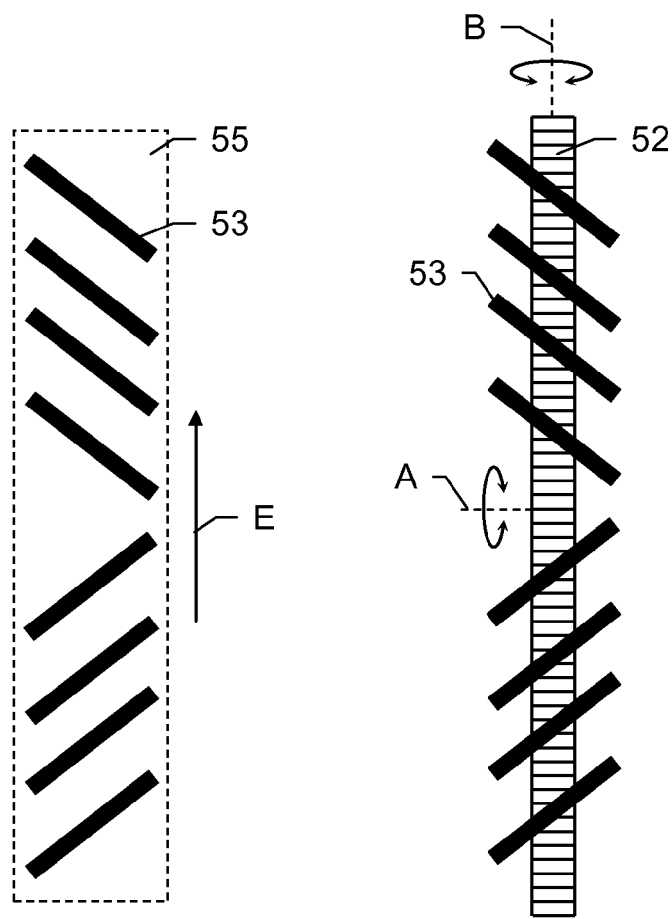
FIGS. 5a-b show a further embodiment of a sensor arrangement of a reflector arrangement according to the invention with a code element with code pattern and a line sensor.

FIG. 5a and FIG. 5b show a specific embodiment for a code element 55 having a code pattern 53 of a sensor arrangement of a reflector arrangement according to the invention and an arrangement of the code element 55 together with a line sensor 52, onto which a projection of the code pattern 53 occurs upon corresponding illumination of the code element 55. The code pattern 53 is configured here as opaque for the illumination radiation, however, the optical properties of code pattern 53 and the surface which encloses or defines the code pattern 53 can be the other way around.

The provided code pattern 53 has a diagonal pattern with respect to the extension direction E of the code element 55, having different diagonal directions of the individual pattern parts (stripes). A first part of the pattern has a pattern alignment having a first angle in relation to the extension direction E, while a second part has a pattern alignment having a second angle, which is different from the first angle.

Using such a code pattern 53, not only can a tilt of the sensor arrangement about a first axis A be determined by illumination, but additionally also a rotation about a second axis B. An unambiguous inclination determination with respect to two axes can thus be carried out.

In the event of a tilt about the axis A, the code pattern 53 projected onto the line sensor 52 is displaced in the direction of the extension direction E. The correspondingly changed projection can be detected by means of the sensor 52 and an offset of the projection and a magnitude (and a direction) for the tilt about the axis A can be determined therefrom.

In the event of a rotation of the arrangement about the axis B, the code pattern 53 projected onto the line sensor 52 is displaced in a direction orthogonal to the extension direction E. The projection thus changed accordingly can similarly be detected by means of the sensor 52, and an offset of the projection and a magnitude (and a direction) for the rotation about the axis B can be determined therefrom.

The respective offset of the projection can be derived from the combination of the respectively illuminated or shaded segments of the line sensor 52.

Due to the different alignments of the code pattern, the mutual determination for both axes is unambiguous. Congruency of the projected code pattern in the event of simultaneous tilting and rotation with a projection, which would arise in the event of an alternative orientation of the arrangement, is thus precluded.

Furthermore, such a code pattern 53 also offers in particular the advantages with respect to accuracy as a pattern according to one of FIGS. 1-3.

According to the invention, the code element 55 is arranged rigidly in relation to the line sensor 52 such that the extension direction E of the code element 55 is oriented in the same direction as, in particular parallel to, the extension direction of the line sensor 52.

Figure 6:
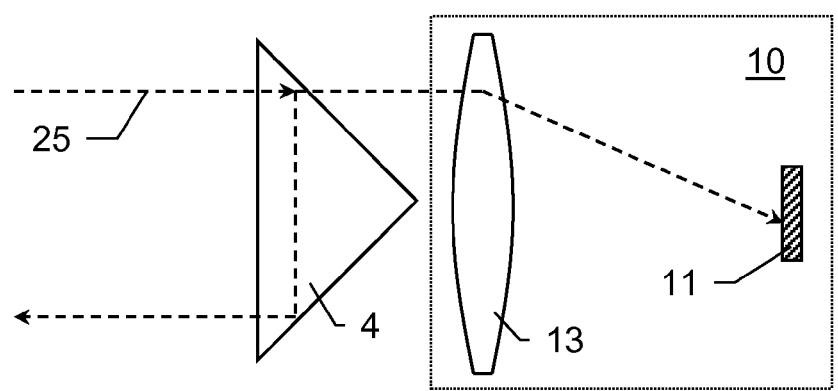
FIG. 6 shows a further embodiment according to the invention of a reflector arrangement with a retroreflector that is configured as a partially transmissive prism.

FIG. 6 shows a further embodiment of a reflector arrangement having a retroreflector 4 which is configured as a partially transmissive (with respect to the radiation 25) prism, and that retroreflects part of the radiation 25, i.e. reflects it parallel or coaxially in dependence on the incidence position at the prism, and transmits the remaining part of the radiation 25 to the sensor arrangement 10. By way of the reflected radiation, a distance and position determination for the reflector arrangement can occur. By way of example, this is effected according to known methods with a total station or a laser tracker, wherein the radiation 25 is emitted as measurement radiation, for example as collimated laser radiation, by the total station or the laser tracker.

The embodiment of the sensor arrangement 10 is not limited to the variants shown here having a lens 13, but can be configured according to any desired corresponding configuration of FIGS. 2-5b—according to the invention in particular according to one of FIGS. 4a-5b. Furthermore, the retroreflector 4 (prism) can be configured according to alternative embodiments for retroreflective elements (e.g. as retroreflective foil).

The part of the radiation 25 transmitted through the prism illuminates the sensor arrangement 10 such that the radiation 25 is conducted onto the sensor 11 and the location of the beam spot thus produced on the sensor (illumination pattern or beam incidence region) is determinable. The determinable location at the same time represents a respective inclination of the reflector arrangement relative to the propagation axis of the radiation 25 (cf. FIGS. 3a-5b). A signal representing the location of the projection (in the case where a code element is used rather than the lens) or the radiation on the detection surface, on the basis of which the inclination determination can take place, is produced using the sensor 11. To this end, the reflector arrangement can have corresponding processing means for inclination determination, and/or signal transmission means, by way of which the location information for the incident radiation (or the signal) or an already determined inclination can be transmitted to the beam-emitting surveying system (e.g. total station). The determined orientation or the orientation to be determined there (and the position information) for example for user guidance or measurement point determination can be correspondingly further processed using the surveying system.

The radiation 25 here acts both as measurement radiation for the position determination and as illumination radiation for the orientation or inclination determination.

A reflector arrangement according to the invention having a sensor arrangement as described above according to FIGS.

1-6—is used specifically with a surveying system, in particular a theodolite, a total station or a laser tracker. The surveying system here typically has a base defining a standing axis, a structure that is movably connected to the base and is rotatable relative to the base about the standing axis, wherein the structure defines a tilt axis, and a targeting unit (in particular telescope) that is movably connected to the structure, is pivotable, in particular rotatable, about the tilt axis relative to the structure, and is provided to emit measurement radiation. The tilt axis is substantially orthogonal to the standing axis.

Also provided are a beam source for generating illumination radiation, in particular the measurement radiation, and an angle and distance measurement functionality.

The surveying system has a controlling and processing unit for controlling a targeting of the sensor arrangement and for determining a position and inclination of the sensor arrangement. During targeting of the sensor arrangement, the inclination of the sensor arrangement relative to an illumination direction (axis of the light irradiation) of the illumination radiation, in particular the measurement radiation, with respect to at least one inclination direction can be derived from an interaction of the illumination radiation, in particular the measurement radiation, and the sensor arrangement.

The laser radiation, with which a distance to a reflective target is determined, can thus be used as illumination radiation for the sensor arrangement. Alternatively or additionally, it is also possible for an additionally provided radiation source to be provided for the emission of the illumination radiation.

It is obvious that these illustrated figures only schematically illustrate possible exemplary embodiments. The various approaches can also be combined according to the invention with one another and with methods for inclination or location determination of an object and with measuring systems of the prior art. The aspects according to the invention can thus be used in particular in conjunction with geodetic surveying systems—such as total stations and tachymeters—or industrial surveying systems—such as for example, laser trackers.

What is claimed is:

1. A reflector arrangement comprising:
   a retroreflector for position determination for the reflector arrangement using parallel beam reflection; and
   a sensor arrangement,
   wherein the sensor arrangement includes:
      a code element with a code pattern, and
      a sensor which is sensitive with respect to at least one wavelength range, with a reception direction that is orthogonal to the detection surface thereof; and
   wherein the code element and the sensor are rigidly connected, with a defined spacing, such that it is possible using the sensor to determine a location, which is angle-dependent with respect to the reception direction, of a projection of the code pattern onto the detection surface.

2. The reflector arrangement according to claim 1, wherein:
   the reception direction of the sensor and an extension direction of the code element are aligned to be mutually orthogonal, and the defined spacing is at least 1 mm and at most 10 mm, wherein an extension direction of the sensor is aligned to be equal to the extension direction of the code element.

3. The reflector arrangement according to claim 1, wherein:
   the code element has regions of different transmissivity at least with respect to optical radiation having a wavelength from the at least one wavelength range, wherein the code pattern is represented by the regions of different transmissivity, wherein the regions of different transmissivity define a line pattern having different line spacings and/or line widths.

4. The reflector arrangement according to claim 1, wherein:
   the sensor comprises a sensor selected from the list consisting of a line sensor, an area sensor, a CCD, and a CMOS.

5. The reflector arrangement according to claim 1, wherein:
   the reflector arrangement has a carrier structure, using which the target points can be positionally determined and/or marked, wherein the retroreflector and the sensor arrangement are carried by the carrier structure and are arranged in a known positional relation with respect to one another.

6. The reflector arrangement according to claim 5, wherein:
   the carrier structure is configured as or has at least one of:
      an auxiliary measuring instrument,
      a mobile portable field controller with an optical targeting or marking unit for the position determination and/or marking of the target points, and
      an add-on apparatus for securing the carrier structure on the auxiliary measuring instrument or the field controller.

7. The reflector arrangement according to claim 1, wherein:
   the auxiliary measuring instrument comprises at least one of a surveying pole and a probing tool.

8. The reflector arrangement according to claim 1, wherein:
   the reflector arrangement has at least one further sensor arrangement carried by the carrier structure, wherein the at least one further sensor arrangement is arranged in a defined alignment and a defined position in relation to the first sensor arrangement for determination of an inclination with respect to a further axis.

9. The reflector arrangement according to claim 1, wherein:
   the reflector arrangement has a plurality of auxiliary point markings in a specified and known spatial distribution relative to one another, wherein the auxiliary point markings provide an inclination determination with respect to at least one further axis for the reflector arrangement by image processing of an image in which the auxiliary point markings are at least partially captured, wherein the auxiliary point markings provide a spatial orientation determination.

10. The reflector arrangement according to claim 9, wherein:
    the auxiliary point markings comprise at least one of light-emitting diodes and reflectors.

11. The reflector arrangement according to claim 1, wherein:
    the reflector arrangement has an inertial measuring unit for continuous determination of an orientation and/or inclination of the reflector arrangement for the determination of a change in at least one of position, orientation, and inclination, wherein the inertial measuring unit has an accelerometer, a rotation rate sensor, an inclination sensor and/or a magnetic compass.

12. The reflector arrangement according to claim 1, wherein:
the reflector arrangement has a transmitting unit for data transmission, wherein the transmitting unit is configured such that the data transmission can be carried out by way of emitting modulated electromagnetic radiation.

13. A calibration method having the reflector arrangement of claim 1, which is configured at least for position determination and/or marking of target points, having
the sensor arrangement which embodies a reference sensor arrangement, and
a first sensor unit,
wherein the reference sensor arrangement and the first sensor unit are arranged in known positional relation, with
generating of reference inclination data with respect to a first axis by way of the reference sensor arrangement; and
calibrating of the first sensor unit with respect to the first axis on the basis of the reference inclination data,
wherein the generating of the reference inclination data includes:
receiving illumination radiation at an angle of incidence,
determining an illumination radiation incidence region, dependent on said angle of incidence, on a sensor of the reference sensor arrangement, and
deriving the reference inclination data from the location of the illumination radiation incidence region and a previously known incidence direction of the illumination radiation,
wherein the calibration of the first sensor unit takes place continuously at defined temporal intervals.

14. The calibration method according to claim 13, wherein:
the illumination radiation comprises collimated illumination radiation.

15. The calibration method according to claim 13, wherein:
the first sensor unit is used to generate first sensor data which represent the inclination with respect to the first axis,
a degree to which the first sensor data and the reference inclination data match is determined and
calibration of the first sensor unit is effected automatically in dependence on the degree of the matching.

16. The calibration method according to claim 13, wherein:
an inclination determination using the first sensor unit involves a changing measurement error, in particular which increases in the temporal progression, and
the measurement error is compensated for by calibrating the first sensor unit,
wherein the first sensor unit is configured as at least one of an inertial measuring unit (IMU) and as a multi-axis inclination sensor.

17. A method comprising:
providing the sensor arrangement of claim 1;
irradiating the retroreflector with measurement radiation and by positionally determining the reflector arrangement by way of the measurement radiation reflected by the retroreflector,
illuminating, in a collimated manner, the sensor arrangement, wherein an angle of incidence is defined by an alignment of the illumination axis in relation to the capturing direction of the sensor of the sensor arrangement,
position-sensitive capturing, with respect to the location on the detection surface of the sensor, of a beam incidence pattern produced during illumination of the illumination cross section or the projection of the code pattern on the sensor, and
deriving an inclination of the reflector arrangement with respect to at least the illumination axis from the location, which can be determined by way of the position-sensitive capturing, of the beam incidence pattern on the detection surface, wherein the location of the beam incidence pattern is dependent on the angle of incidence.

18. One or more non-transitory computer-readable media storing one or more programs that are configured, when executed, to cause one or more processors to execute the method recited in claim 13.

* * * * *